United States Patent [19]
Ina et al.

[11] Patent Number: 5,670,934
[45] Date of Patent: Sep. 23, 1997

[54] ANTI-THEFT DEVICE HAVING MINIMAL POWER CONSUMPTION CHARACTERISTICS

[75] Inventors: Hiroyuki Ina, Kariya; Hidehito Mori, Anjo, both of Japan

[73] Assignee: Nippondenso Co., Ltd., Kariya, Japan

[21] Appl. No.: 721,738

[22] Filed: Sep. 27, 1996

[30] Foreign Application Priority Data

Sep. 29, 1995 [JP] Japan .................................. 7-253703

[51] Int. Cl.⁶ ........................................... B60R 25/10
[52] U.S. Cl. .................. 340/426; 340/428; 307/10.2; 307/10.3; 307/10.5; 180/287
[58] Field of Search ................... 340/425.5, 426, 340/428, 429, 430; 307/10.2, 10.3, 10.4, 10.5, 10.6, 10.7; 180/287

[56] References Cited

U.S. PATENT DOCUMENTS

| | | | |
|---|---|---|---|
| 4,291,237 | 9/1981 | Kitano | 307/426 |
| 4,858,453 | 8/1989 | Namazue | 250/216 |
| 4,965,460 | 10/1990 | Tanaka et al. | |
| 5,079,435 | 1/1992 | Tanaka | |
| 5,481,253 | 1/1996 | Phelan et al. | 340/325.31 |
| 5,555,863 | 9/1996 | Kokubu | 307/10.3 |
| 5,606,306 | 2/1997 | Mutoh et al. | 340/426 |

FOREIGN PATENT DOCUMENTS

| | | |
|---|---|---|
| 63-298418 | 12/1988 | Japan . |
| 5-39767 | 2/1993 | Japan . |

*Primary Examiner*—Thomas Mullen
*Assistant Examiner*—Nina Tong
*Attorney, Agent, or Firm*—Nixon & Vanderhye P.C.

[57] ABSTRACT

When a key is inserted into a key cylinder and a key insertion switch switches from an open state to a closed state, a signal is provided to a main relay controller. This main relay controller provides a low level signal to a base of a first transistor to actuate a coil. Therefore, a contact point is closed and power is supplied to an anti-theft controller and an engine controller. Thus, these controllers do not consume power until the key insertion switch is closed and thus, their construction can be made simple since there is no need to operate them in a sleep mode.

20 Claims, 8 Drawing Sheets

ANTI-THEFT DEVICE HAVING MINIMAL POWER CONSUMPTION CHARACTERISTICS

CROSS-REFERENCE TO RELATED APPLICATION

This application is related to and claims priority from Japanese Patent Application No. Hei-7-253703, the contents of which are hereby incorporated by reference.

BACKGROUND OF THE INVENTION

1. Field of the Invention

The present invention relates to an anti-theft device, and more particularly to an anti-theft device for a vehicle.

2. Description of Related Art

As an anti-theft device, a vehicular anti-theft device is well-known. Normal operation for this vehicular anti-theft device involves actuating an ignition switch by rotating a key rotor using a key, making a secret identification code verification unit execute a communication procedure to verify a secret identification code of the key with reference to a secret identification code of the vehicle after power is supplied to the same secret identification code verification unit and allowing or prohibiting engine start based on a result of the verification operation.

However, the following problem occurs when communication with the key is carried out when the ignition switch is actuated. That is, normally, a time period of 100–500 ms is needed for the secret identification code verification unit to carry out the communication. Therefore, if a starter switch is actuated quickly when performing the communication after the ignition switch is actuated, there is a strong probability that the communication operation will be performed while the starter is in operation. In this case, communication is carried out with reduced battery voltage due to cranking and thus, communication errors may occur.

Accordingly, Japanese Patent Laid-Open Publication No. Hei 5-39767 discloses an anti-theft device which carries out the above-described communication operation before the ignition switch is actuated (i.e., before the engine starts operating). In this anti-theft device, an antenna of a transmission circuit inside the key generates an unlock signal for a fixed time period after a key detection switch detects the insertion of key into the key rotor. The unlock signal is received by the antenna of the vehicle and transmitted to a code determination circuit (i.e., a secret identification code verification device).

The code determination circuit determines whether the unlock signal is the prescribed code signal or not. If the unlock signal is the prescribed code signal, the starting operation of the engine is permitted. Otherwise, the starting operation of the engine is prohibited.

Meanwhile, as described above, generally, power is supplied to the secret identification code verification device after the ignition switch is actuated. In other words, as in conventional devices, in order to carry out such communication after inserting the key into the key rotor, power has to be supplied to the secret identification code verification device beforehand.

One possible solution is to supply power to the secret identification code verification device at all times even if the key is not inserted in the key rotor.

However, in this case, when a CPU of the secret identification code verification device is in a high speed mode (for example, operating at 8 MHz), power consumption of the secret identification code verification device becomes large, which may drain the battery and the like.

Furthermore, as another measure, the CPU inside the secret identification code verification device may be set to what is commonly known as a sleep mode (for example, low speed operation at 500 kHz) while the key is not inside the key rotor.

Since the power consumption is small during the sleep mode, the above-described problem regarding the battery being drained can be avoided. On the other hand, the CPU inside the secret identification code verification device must be provided with hardware which can operate in the sleep mode and thus, the construction of the secret code identification device becomes complicated. Also, while the power consumption is small, the power consumption will never be zero because the CPU is in operation.

The above-described problem occurs not only for the vehicular anti-theft device. The same problem occurs in an anti-theft device for a mobile body, which moves when its motor is driven, when communication operations are carried out before the motor is started.

SUMMARY OF THE INVENTION

In view of the foregoing problems of the prior art, it is a primary object of the present invention to provide an anti-theft device which performs communication before the motor is started and whose secret identification code verification unit has small power consumption and a simple construction.

The above object is achieved according to a first aspect of the present invention which provides an anti-theft device for verifying a first secret identification code transmitted by a start command device with reference to a second secret identification code of a moving body driven by a motor. The anti-theft device includes a start command detection unit, a receiver, a secret code identification verification unit, a first switching unit, a motor controller, a second switching unit and a main relay unit. The start command detection unit is for detecting a start condition indicative of start of a transmission operation of the start command device. The receiver is for receiving the first secret identification code from the start command device when the start command detection unit detects the start condition. The secret identification code verification unit, which is connected to an external power source, is for receiving the first secret identification code from the receiver and for generating a verification signal after comparing the first secret identification code and the second secret identification code. The secret identification code verification unit is actuated after receiving power from the external power source when the start command detection unit detects the start condition. The first switching unit is for connecting and disconnecting the secret identification code verification unit from the external power source. The motor controller, which is connected to the external power source, is for receiving the verification signal from the secret identification code verification unit and for controlling the motor based on the verification signal after receiving power from the external power source when the start command detection unit detects the start condition. The second switching unit is for connecting and disconnecting the motor controller from the external power source. The main relay unit, which is connected to the external power source to always receive power from the external power source, is for controlling the first switching unit to connect the secret identification code verification unit with the external power source when the start command detection unit detects the start condition and being for controlling the second switching unit to connect the motor controller with the external power source when the start command detection unit detects the start condition.

In this way, since power is always supplied to the main relay unit, the main relay unit can always monitor if the start command detection unit has detected the above-described start condition. When the start command detection unit detects the start condition, the main relay unit controls the first switching unit to connect the secret identification code verification unit with the external power source and the second switching unit to connect the motor controller with the external power source. Thus, there is no need to always supply power to the secret identification code verification unit and the motor controller, and thus, power consumption of the anti-theft device can be reduced compared to the case when the secret identification code verification unit and the motor controller are continuously supplied with power. Also, since the main relay unit can detect whether or not the start command detection unit detected the start condition, there is no need to operate the secret identification code verification unit and the motor controller in a sleep mode and so, the secret identification code verification unit and the motor controller do not need hardware which can be operated in the sleep mode and so, the construction of these circuits can be simplified.

Preferably, the motor controller is for allowing starting of the motor when the verification signal from the secret identification code verification unit indicates a match of the first secret identification code with the second secret identification code and for prohibiting starting of the motor when the verification signal from the secret identification code verification unit indicates a mismatch of the first secret identification code with the second secret identification code.

Preferably, the anti-theft device further includes a first memory, a verification result storage unit, a time measurement unit and a measurement time determination unit. The verification result storage unit is for storing verification information indicative of the verification signal in the first memory. The time measurement unit is for measuring elapsed time since the start command detection unit detected the start condition. The measurement time determination unit is for determining if the elapsed time is no less than a predetermined amount of time. Here, the main relay unit controls the first and second switching units to disconnect the secret identification code verification unit and the motor controller from the external power source when the measurement time determination unit determines that the elapsed time is no less than the predetermined amount of time.

In this way, after the predetermined period of time elapses since the start command detection unit detected the start condition, power supply to the secret identification code verification unit and the motor controller is stopped and so, power consumption of the anti-theft device can be reduced.

Preferably, the anti-theft device further includes a verification result revision unit for setting the verification information stored in the first storage unit to indicate a mismatch when the measurement time determination unit determines that the elapsed time is no less than the predetermined amount of time. In this way, the contents of the first memory is set to indicate a mismatch after the predetermined period of time elapses. Thus, even if a driver other than the legal driver of the vehicle tries to forcibly actuate the secret identification code verification unit after the legal driver drove the vehicle, since the verification result is set to indicate a mismatch after the predetermined amount of time elapses, the starting of the motor is prohibited.

Preferably, the anti-theft device further includes an additional verification unit for driving the secret identification code verification unit to recompare the first and the secret identification codes when the measurement time determination unit determines that the elapsed time is no less than the predetermined amount of time. In this way, when another driver other than the legal driver of the vehicle tries to actuate the motor, since this other driver does not have the proper start command device, the verification result of the secret identification code verification unit would indicate a mismatch and so, the starting of the motor is prohibited.

Preferably, the anti-theft device further includes a termination signal generation unit, a motor termination determination unit, a second memory, a training value storage unit and a training value storage completion determination unit. The termination signal generation unit is for generating a termination signal for terminating the motor. The motor termination determination unit is for determining whether the termination signal generation unit generated the termination signal. The training value storage unit is for storing a training value of the motor in the second memory when the motor termination determination unit determines that the termination signal has been generated by the termination signal generation unit. The training value storage completion determination unit is for determining whether the training value storage unit has completed storage of the training value in the second memory. Here, the main relay unit controls the first and the second switching units to disconnect the secret identification code verification unit and the motor controller from the external power source after the training value storage completion determination unit determines completion of the storage of the training value. In this way, since power supply to the secret identification code verification unit and the motor controller is continued until the storage process is completed, the storage of the training value in the second memory can be carried out with certainty.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PRESENTLY PREFERRED EXEMPLARY EMBODIMENTS

Preferred embodiments of the present invention are described hereinafter with reference to the accompanying drawings.

An overall construction of the present invention will be explained with reference to FIG. 1.

A key 1 includes a capacitor (not shown), which stores charge in accordance with power (radio wave) transmitted from an antenna 17 described later, and a transmitter (not shown), which is powered by charge stored in the capacitor, for transmitting a secret identification code stored in the key 1 to the antenna 17.

Figure 1:
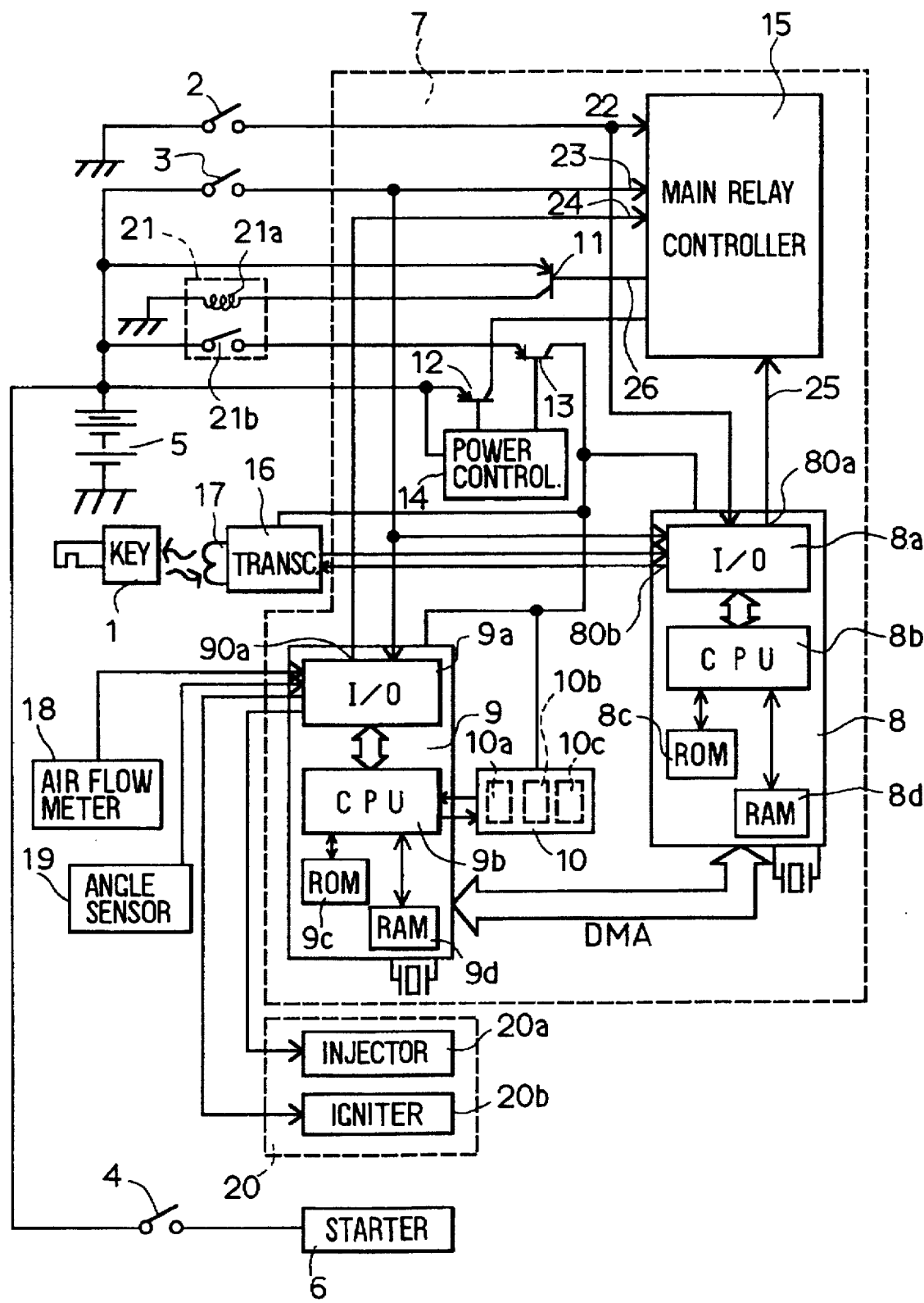
FIG. 1 is a block diagram of a vehicular anti-theft device according to an embodiment of the present invention.
Figure 2:
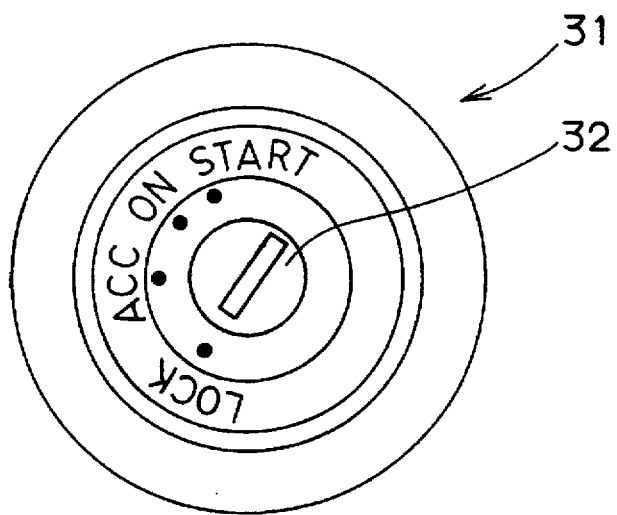
FIG. 2 is a front view of a key cylinder according to the embodiment.

When the key 1 is inserted into a key cylinder 31 shown in FIG. 2 provided in a steering column portion of a vehicle, a key insertion switch 2 shown in FIG. 1 is mechanically closed. When the key insertion switch 2 is closed, a low level signal is provided to an anti-theft controller 8 and a main relay controller 15. When the key insertion switch 2 is open, a high level signal is generated to the anti-theft controller 8 and the main relay controller 15.

When the key 1 is rotated and a key rotor 32 is set to an "ON" position shown in FIG. 2, an ignition switch 3 in FIG. 1 is mechanically closed. When the key 1 is rotated further to set the key rotor 32 to a "START" position shown in FIG. 2, a starter switch 4 is mechanically closed and power from a battery 5 is supplied to a starter 6 so that the starter 6 starts to operate.

An engine electronic control unit 7 includes the anti-theft controller 8, an engine controller 9, an EEPROM 10, first through third transistors 11–13, a power control unit 14 and the main relay controller 15.

The anti-theft controller 8 verifies the secret identification code of the key 1 by comparison with the secret identification code in the EEPROM 10 and transmits verification results to the engine controller 9 via DMA (direct memory access). The anti-theft controller 8 has an input/output port 8a, a CPU 8b, a ROM 8c and a RAM 8d. The input/output port 8a receives signals from the key insertion switch 2 and the ignition switch 3, and the secret identification code stored in the key 1 from a transceiver 16.

Signals from a CPU one minute timer port 80a (a part of the input/output port 8a) are generated from the input/output port 8a. A transmission/receiving switching port 80b, which is a part of the input/output port 8a, can be switched to a transmission mode for transmitting radio wave from an antenna 17 and to a reception mode for receiving the secret identification code stored in the key 1. For example, when the switching port 80b is at a high level, the transmission mode is set and when the switching port 80b is at a low level, the reception mode is set. The control process carried out by the CPU 8b is described later.

The transceiver 16 modulates and amplifies the radio wave transmitted to the key 1 via the antenna 17 and demodulates the secret identification code transmitted from the key 1. The engine controller 9 calculates a fuel injection amount and ignition timing based on signals from an air flow meter 18, a rotational angle sensor 19 and the like. The engine controller 9 controls an engine 20 (an injector 20a, an igniter 20b and the like) and stores training values (for example, a training value of an air-fuel ratio) of the engine 20 in the EEPROM 10 based on the results of the calculation. Also, the engine controller 9 prohibits or allows the actuation of the engine 20 based on the verification results from the anti-theft controller 8. The engine controller 9 includes an input/output port 9a, a CPU 9b, a ROM 9c and a RAM 9d.

The input/output port 9a receives signals from the ignition switch 3, the air flow meter 18 and the rotational angle sensor 19. The input/output port 9a provides signals to the injector 20a and the igniter 20b while a CPU main relay control port 90a (which is part of the input/output port 9a) also generates signals. The control process executed by the CPU 9b is explained later.

An EEPROM 10, which can retain its stored contents even when power supply from the battery 5 is stopped, is connected to the CPU 9b. A region 10a which is a first storage unit for storing a theft determination flag that indicates the verification results of the secret identification codes (i.e., the secret identification code in the key 1 and the secret identification code of the vehicle which is stored in a region 10c described later), a region 10b which is a second storage unit for storing the training values of the engine 20, and the region 10c which is a third storage unit for storing the secret identification code of the vehicle are formed in the EEPROM 10. The secret identification code of the vehicle is sent to the anti-theft controller 8 via the engine controller 9.

An emitter of the first transistor 11 is connected to the battery 5, a base thereof is connected to the main relay controller 15 and a collector thereof is connected to a coil 21a of a main relay 21 disposed outside the engine electronic control unit 7. Therefore, when the main relay controller 15 provides a low signal to the base of the first transistor 11, the first transistor 11 is switched to a conducting state and the electricity flows to the coil 21a to close a contact point 21b of the main relay 21.

An emitter of the second transistor 12 is connected to the battery 5, a base thereof is connected to the power control unit 14 and a collector thereof is connected to the main relay controller 15. Meanwhile, an emitter of the third transistor 13 is connected to the contact point 21b, a base thereof is connected to the power control unit 14 and a collector thereof is connected to the anti-theft controller 8, the engine controller 9 and the transceiver 16.

Voltage from the battery 5 is always applied to the power control unit 14. The power control unit 14 controls the base voltages of the second transistor 12 and the third transistor 13 so that the voltage of their collectors are set to a predetermined voltage (which is 5 V in the present embodiment).

Therefore, since the emitter voltage of the second transistor 12 is always at battery voltage level (which is 12 V in the present embodiment), a voltage of 5 V is always applied to the main relay controller 15.

Since the emitter voltage of the third transistor 13 is at the battery voltage level when the coil 21a is in the conducting state and the contact point 21b is closed, a voltage of 5 V is applied to the anti-theft controller 8, the engine controller 9, the EEPROM 10 and the transceiver 16. That is, when the contact point 21b is open, 5 V is not applied to the anti-theft controller 8, the engine controller 9, the EEPROM 10 and the transceiver 16.

The main relay controller 15 receives a signal 22 from the key insertion switch 2, a signal 23 from the ignition switch 3, a signal 24 from the CPU main relay control port 90a and a signal 25 from the CPU one minute timer port 80a and, based on these signals 22–25, generates a signal 26 to the base of the first transistor 11.

Figure 3:
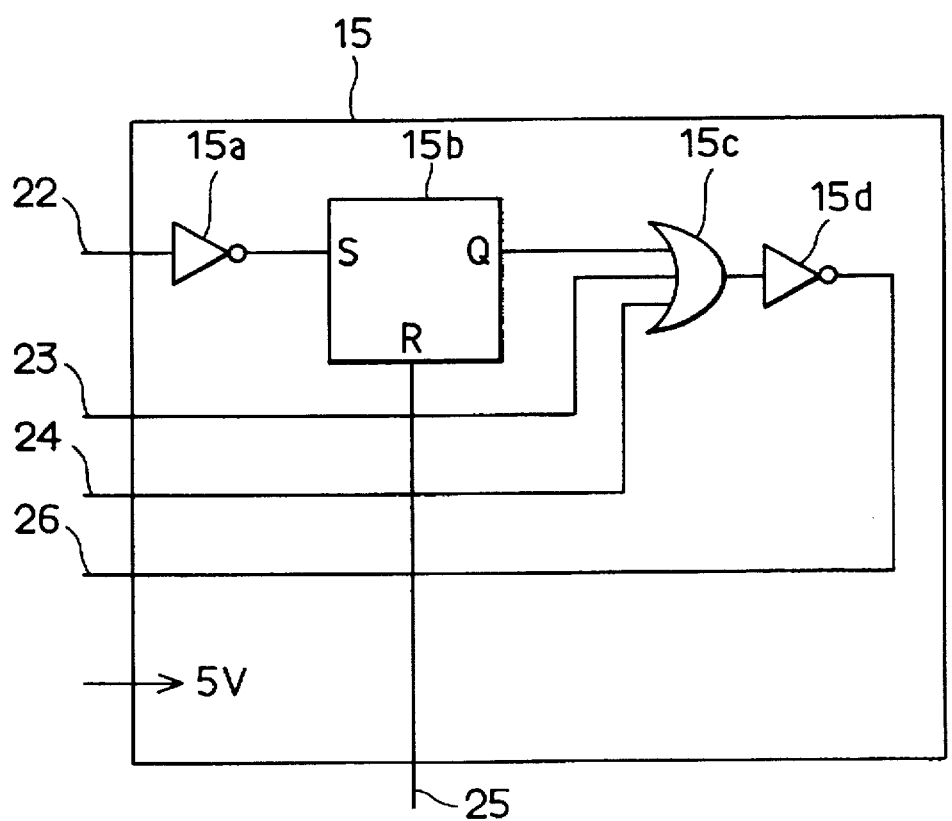
FIG. 3 is a schematic diagram of a main relay controller in the embodiment.

The main relay controller 15 is shown in detail in FIG. 3. That is, after the signal 22 is inverted by a NOT circuit 15a, the signal 22 is provided to a set terminal S of an RS flip flop 15b. The set terminal S is set by a rising edge of the signal from the NOT circuit 15a. The signal 25 is provided to a reset terminal R of the flip flop 15b.

The signal from an output terminal Q of the flip flop 15b, the signal 23 and the signal 24 are provided to an OR circuit 15c. After the output of the OR circuit 15c is inverted by a NOT circuit 15d, the output signal 26 is provided to the base of the first transistor 11.

Since 5 V is always applied to the main relay controller 15d, the output signal 26 can always be generated based on the signals 22 through 25.

Since the main relay controller 15 is a simple circuit compared to a CPU and does not have a transmitter like the CPU, the main relay controller 15 operates with minimal power consumption. It must be noted here that the power consumption of the main relay controller 15 can be made small by forming it using CMOS (complementary metal oxide semiconductor) devices.

Next, the control processes carried out by the CPUs of the anti-theft controller 8 and the engine controller 9 are explained hereinafter.

Figure 4:
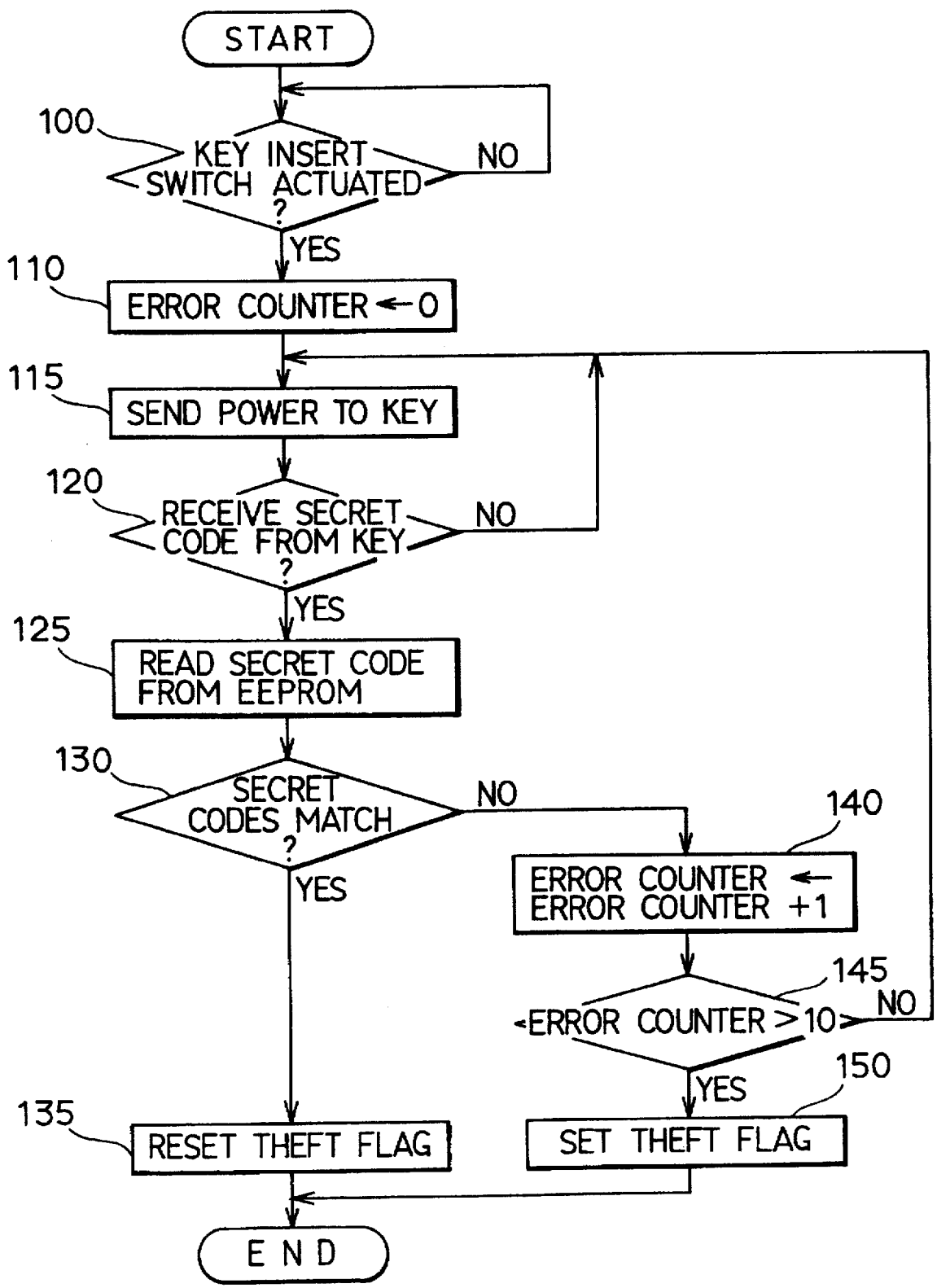
FIG. 4 is a flowchart of an initial routine of an anti-theft controller according to the embodiment.
Figure 5:
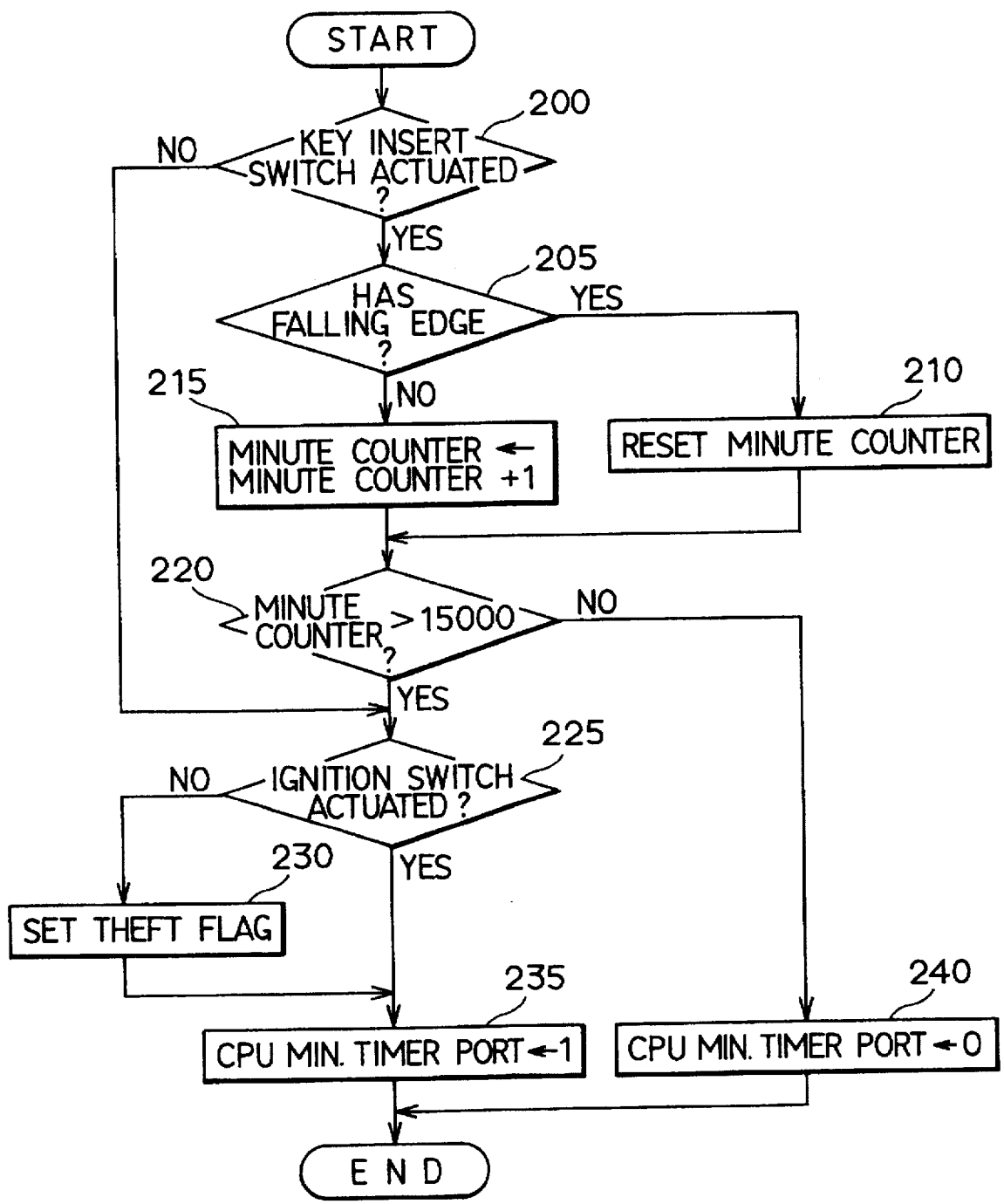
FIG. 5 is a flowchart of an interrupt routine of the anti-theft controller according to the embodiment.

First of all, the control process carried out by the CPU 8b of the anti-theft controller 8 is explained with flowcharts shown in FIGS. 4 and 5.

When voltage is applied to the anti-theft controller 8, an initial routine shown in FIG. 4 is activated only once during the application of the voltage. In this routine, step 100 determines whether the key insertion switch 2 is closed or not and when step 100 gives a positive output, subsequent step 110 resets an error counter inside the RAM 8d. When step 100 gives a negative output, the process of step 100 is repeated.

Step 115 provides a high level signal to the transmission/reception switching port 80b for a predetermined time period (for example, 50 ms) to set the transmission mode. As a result, the power (radio wave) amplified by the transceiver 16 is transmitted to the key 1 for a predetermined time period via the antenna 17 and electric charge accumulates in the capacitor inside the key 1. It should be noted that the predetermined time period in this case is a time period long enough to make the electric charge stored in the capacitor large enough to power the transmitter of the key 1.

Step 120 provides the low level signal to the transmission/reception switching port 80b to set the reception mode. In this way, the transmitter of the key 1 transmits the secret identification code inside the key 1. Step 120 determines whether the secret identification code of the key 1 has been received or not. When step 120 gives a negative output, control returns to step 115. When step 120 gives a positive output, control goes to step 125.

Step 125 loads the secret identification code (secret identification code of the vehicle) stored in the region 10c of the EEPROM 10 via DMA. Step 130 verifies if the secret identification code of the key 1 matches the secret identification code of the EEPROM 10. When these secret identification codes match, it is determined that theft of the vehicle has not occurred, and step 135 transmits the signal for resetting the theft determination flag to the engine controller 9 by DMA and so, the theft determination flag in the region 10a of the EEPROM 10 is reset. That is, information that the theft of the vehicle has not occurred is stored in the EEPROM 10. In this way, the execution of this routine is completed.

When the secret identification codes do not match, control jumps to step 140 which increments the error counter inside the RAM 8d by one and step 145 determines whether or not the error counter exceeds a predetermined level (which is set to 10 in this embodiment). When step 145 gives a negative output, control returns to step 115. When step 145 determines that the level has been surpassed, although the key 1 continues to transmit the secret identification code, the anti-theft controller 8 will not be able to receive the correct secret identification code. That is, it is determined that the vehicle is stolen. Therefore, step 150 transmits the signal for setting the theft determination flag to the engine controller 9 by DMA and so, the theft determination flag inside the range 10a of the EEPROM 10 is set. That is, information that theft of the vehicle has occurred is stored in the EEPROM 10. In this way, the execution of this routine is completed.

Meanwhile, when voltage is applied to the anti-theft controller 8, aside from the routine shown in FIG. 4, an interrupt routine shown in FIG. 5 is activated at a predetermined time period (4 ms in this embodiment). In this routine, step 200 determines whether the key insertion switch 2 is closed or not. When step 200 gives a positive output, control goes to step 205, while control jumps to step 225 when step 200 determines that the key insertion switch 2 is open.

Step 205 determines whether or not the key insertion switch 2 is switched from an open state to a closed state by determining whether or not there is a falling edge from the high level to the low level in the signal 22. That is, step 205 determines whether or not the key 1 is inserted into the key cylinder 31 (FIG. 2). When step 205 gives a positive output, step 210 resets a one minute counter (i.e., a counter for counting the amount of time the key 1 is continuously inserted in the key cylinder 31) inside the RAM 8d. On the other hand, when step 205 gives a negative output, step 215 increments the one minute counter by one.

Step 220 determines whether or not the one minute counter exceeds a predetermined value (15000 in the present embodiment). That is, step 220 determines whether or not the key 1 is continuously inserted in the key cylinder 31 for a predetermined amount of time (one minute in the embodiment). When step 220 gives a negative output, control jumps to step 240 and generates the low level signal from the CPU one minute timer port 80a. That is, the signal 25 (shown in FIG. 3) is set to the low level.

When step 220 gives a positive output, step 225 determines whether the ignition switch 3 is closed or not. When step 225 gives a negative output, step 230 transmits a signal for setting the anti-theft determination flag to the engine controller 9 by DMA and so, the anti-theft determination flag inside the region 10a of the EEPROM 10 is set.

Step 235 generates the high level signal from the CPU one minute timer port 80a. That is, the signal 25 (FIG. 3) is set to the high level, and the execution of this routine is completed.

Figure 6:
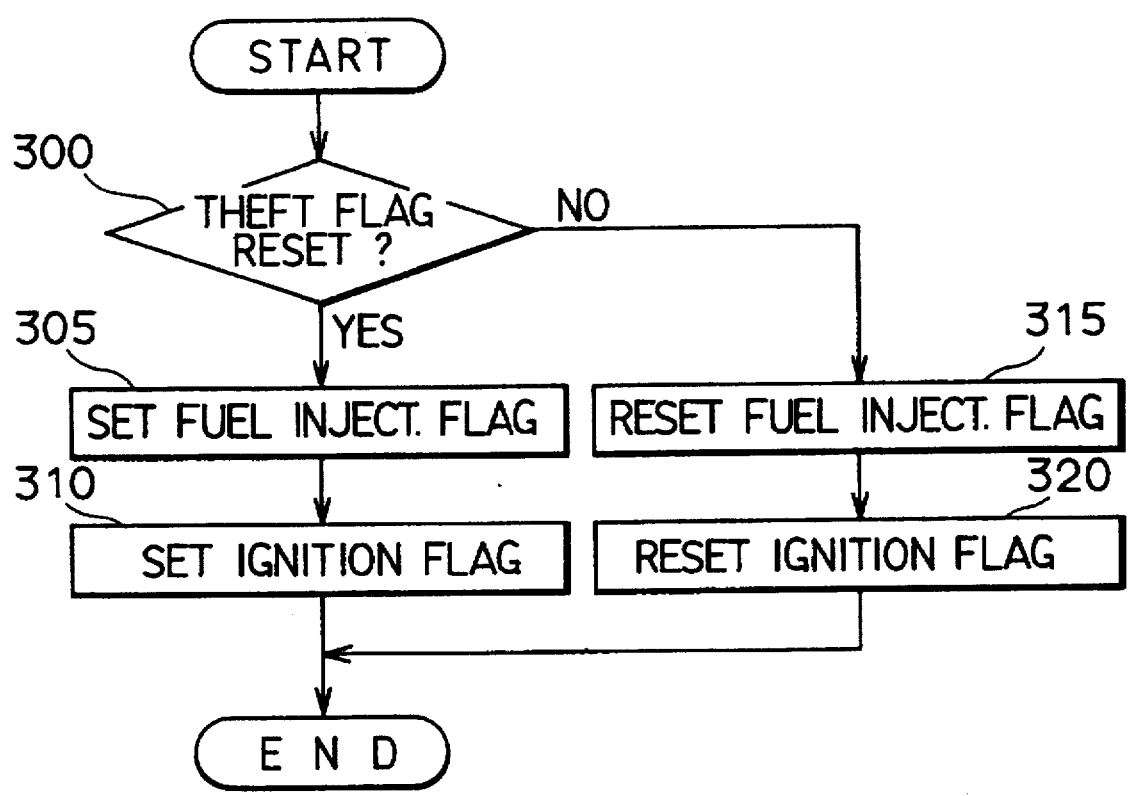
FIG. 6 is a flowchart of an interrupt routine of an engine controller according to the embodiment.

Next, the control process carried out by the CPU 9b of the engine controller 9 is explained with reference to flowcharts of FIGS. 6 and 7. When voltage is applied to the engine controller 9, the interrupt routine of FIG. 6 is executed at a predetermined time interval (4 ms in the embodiment). In this routine, step 300 determines whether the theft determination flag stored in the region 10a of the EEPROM 10 is reset or not. That is, step 300 determines if there is no theft of the vehicle. When step 300 gives a positive output, steps 305 and 310 set the fuel injection flag and the ignition flag and the execution of this routine is finished. On the other hand, when step 300 gives a negative output, steps 315 and 320 reset the fuel injection flag and the ignition flag and thus, the execution of this routine is completed.

The engine controller 9 determines whether or not the ignition switch 3 is closed based on a control routine (not shown) and when the result of the determination of the engine controller 9 is positive, control for transmitting the fuel injection pulse to the injector 20a is carried out if the fuel injection flag is set and control for transmitting the ignition pulse to the igniter 20b is carried out if the ignition flag is set.

On the other hand, even if the ignition switch 3 is determined to be closed, the fuel injection pulse is not transmitted to the injector 20a when the fuel injection flag is reset and the ignition pulse is not transmitted to the igniter 20b when the ignition flag is reset. That is, when both fuel injection and ignition flags are set, the start of the engine 20 is allowed and when both fuel injection and ignition flags are reset, the start of the engine 20 is prohibited.

Figure 7:
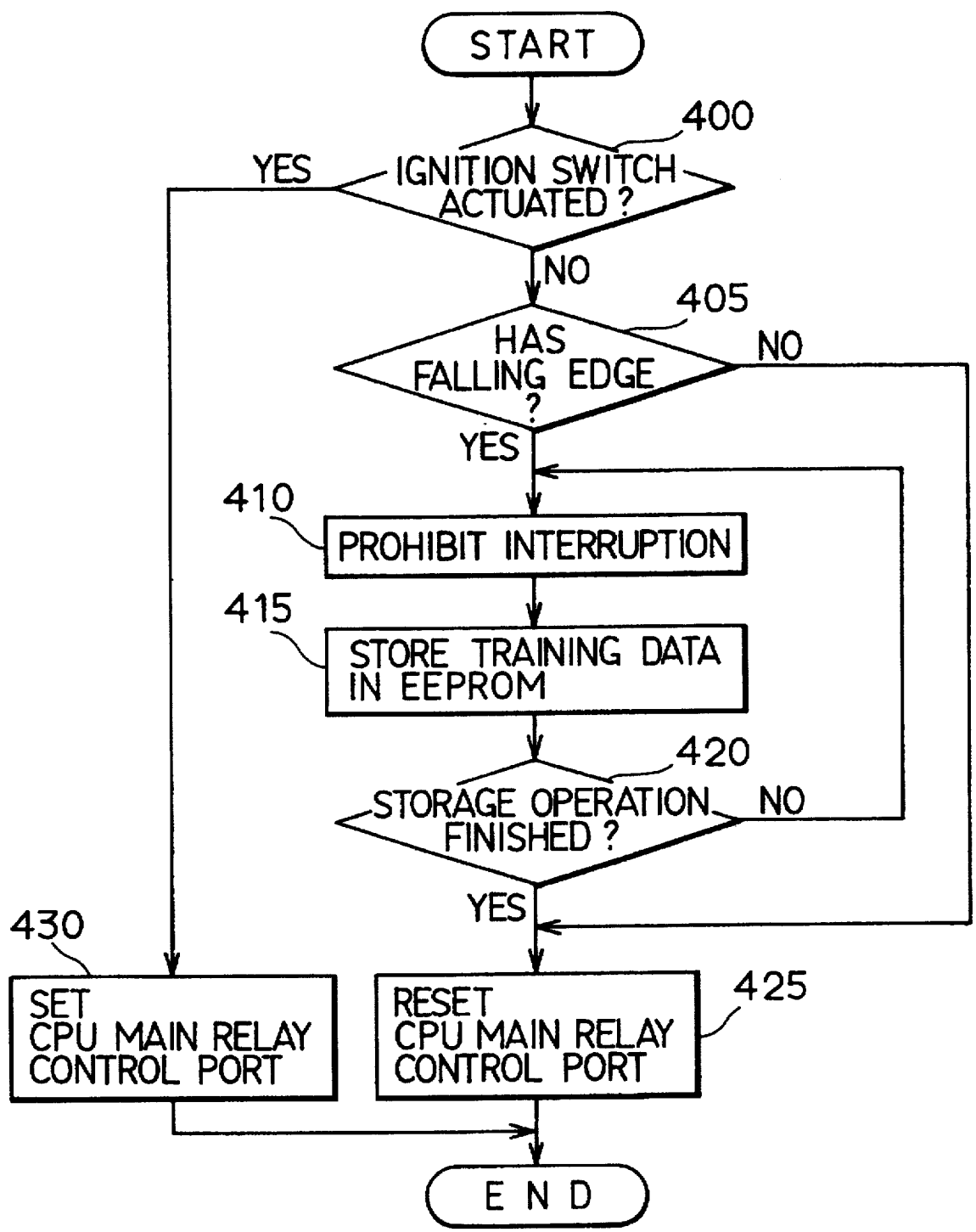
FIG. 7 is a flowchart of another interrupt routine of the engine controller according to the embodiment.

When voltage is applied to the engine controller 9, aside from the routine shown in FIG. 6, the interrupt routine in FIG. 7 is activated at the-predetermined time interval (4 ms in the embodiment). In this routine, step 400 determines whether the ignition switch 3 is closed or not. When step 400 determines that the ignition switch 3 is closed, control jumps to step 430 which generates the high level signal from the CPU main relay control port 90a. That is, the signal 24 (shown in FIG. 3) is set to the high level, and the execution of this routine is completed.

When step 400 gives a negative output, subsequent step 405 determines whether or not the ignition switch 3 is switched from the closed state to the open state by determining whether or not there is a falling edge from the high level to the low level. When step 405 gives a negative output, control jumps to step 425 which generates the low level signal from the CPU main relay control port 90a. That is, the signal 24 (FIG. 3) is set to the low level, and the execution of this routine is completed.

When step 405 gives a positive output, step 410 prohibits interruption by all routines and step 415 stores the training value (for example, the training value of the air-fuel ratio) of the engine 20 in the region 10b of the EEPROM 10. Step 420 determines whether the storage operation is finished or not and when step 420 gives a negative output, control returns to step 410. On the other hand, when step 240 gives a positive output, the process of step 425 is carried out.

The training value described above is stored in the RAM 9d by a routine (not shown) executed by the engine controller 9 while the ignition switch 3 is closed and the engine 20 is running. Therefore, step 415 stores the training value stored in the RAM 9d in the region 10b of the EEPROM 10 while the ignition switch 3 is closed.

Next, actual operations of the control processes shown in FIGS. 4 through 7 are explained hereinafter with reference to FIG. 8.

Figure 8:
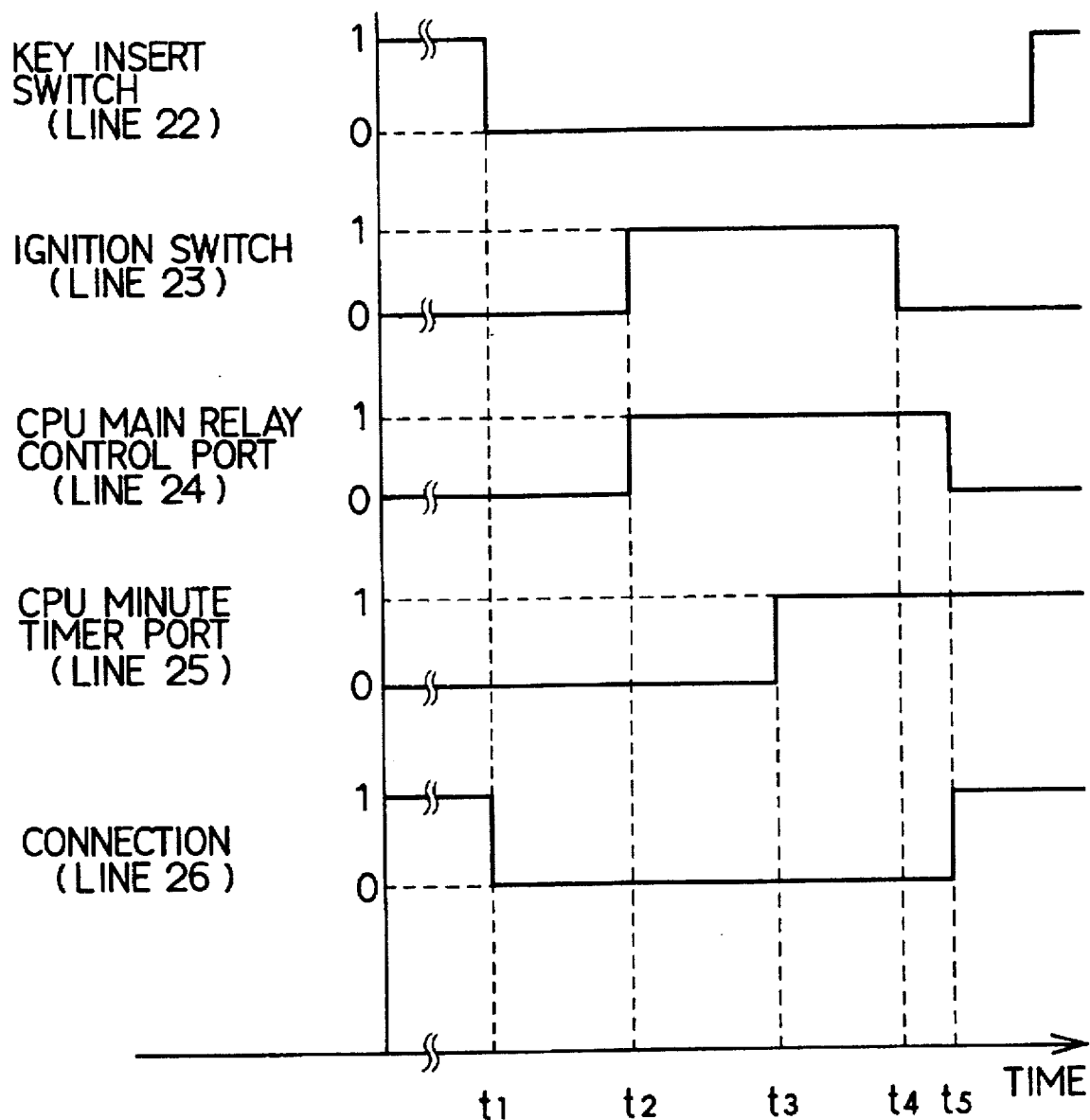
FIG. 8 is a time chart illustrating a detailed operation of the anti-theft device according to the embodiment.

When the passenger inserts the key 1 into the key cylinder 31 at time t1 in FIG. 8, the key insertion switch 2 is closed. Since the signal 22 goes from high to low and the output of the inverter 15a rises from low to high, the set terminal S of the flip flop 15b is set.

A high signal is generated from the OR circuit 15c, the output signal 26 is switched from high to low and the first transistor 11 is switched to the conducting state so that the coil 21a is in the conducting state. As a result, the contact point 21b is closed and the power is supplied to the anti-theft controller 8, the engine controller 9, the EEPROM 10 and the transceiver 16 to activate the routines of FIGS. 4 through 7.

With the routine of FIG. 4, when the verification result of the routine of FIG. 4 for the secret identification code of the key 1 with respect to the secret identification code of EEPROM 10 indicates that both secret identification codes match, step 135 resets the anti-theft determination flag and thus, the fuel injection flag and the ignition flag are set by the routine in FIG. 6. When the verification result of the routine of FIG. 4 indicates a mismatch, the anti-theft determination flag is set, and therefore, the fuel injection flag and the ignition flag are reset by the routine of FIG. 6.

When the passenger rotates the key 1 to close the ignition switch 3 at time t2, step 400 in FIG. 7 gives a positive output so that step 430 generates the high level signal from the CPU main relay control port 90a. That is, the signal 24 is set to the high level. When the fuel injection flag and the ignition flag are set at time t2, the start of the engine 20 is allowed and when both flags are reset, the start of the engine 20 is prohibited.

At time t3 after one minute has elapsed since time t1, step 220 in FIG. 5 gives a positive output, step 325 generates the high level signal from the CPU one minute timer port 80a. That is, the signal 25 is set to the high level.

At this time, since the reset terminal R of the flip flop 15b is set, the output of the output terminal Q of the flip flop 15b becomes low. Since the signals 24 and 25 are high, the output signal 26 becomes low and so, the contact point 21b remains closed.

When the passenger rotates the key 1 in the key cylinder 31 at time t4 to open the ignition switch 3, step 405 in FIG. 7 gives a positive output and step 415 starts storing the training value of the engine 20 in the region 10b of the EEPROM 10. After this storage operation is completed at time t5, step 425 in FIG. 7 generates the low level signal from the CPU main relay control port 90a. That is, the signal 24 is set to the low level.

Although the signal 23 is set to the low level by opening the ignition switch 3 at time t4, since the signal 24 is still at the high level at this point, the output signal 26 will be at the low level and the contact point 21b remains closed. Since the signal 24 also becomes low at the time t5, all inputs of the OR circuit 15c becomes low and thus, the output signal 26 becomes high. As a result, the contact point 21b is opened and power supply to the anti-theft controller 8, the engine controller 9, the EEPROM 10 and the transceiver 16 is stopped.

As described above, according to the present embodiment, the insertion of the key 1 into the key cylinder 31 and the closure of the key insertion switch 2 closes the contact point 21b of the main relay 21 and thus, a predetermined voltage (5 V) is applied to the anti-theft controller 8, the engine controller 9, the EEPROM 10 and the transceiver 16. Power supply to the anti-theft controller 8, the engine controller 9, the EEPROM 10 and the transceiver 16 is continued until all the following conditions are met, that is, 1) the ignition switch 3 is open, 2) a specified time period (one minute) has elapsed after closing the key insertion switch 2, and 3) the storage of the training value of the engine 20 in the region 10b of the EEPROM 10 has been completed after the ignition switch 3 is switched from a closed state to an open state.

In the other words, after closing the key insertion switch 2, power supply to the anti-theft controller 8, the engine controller 9, the EEPROM 10 and the transceiver 16 is stopped after the above-described conditions 1) through 3) are met.

Therefore, after closing the key insertion switch 2 and satisfying the above-described conditions 1) through 3), since the power supply to the anti-theft controller 8, the engine controller 9, the EEPROM 10 and the transceiver 16 is stopped, power consumption of the anti-theft controller 8, the engine controller 9 and the transceiver 16 can be reduced compared to the case in which power supply to the anti-theft controller 8, the engine controller 9 and the transceiver 16 is continued.

Since no power is supplied to the anti-theft controller 8 and the engine controller 9 before the key 1 is inserted into the key cylinder 31 (FIG. 2), these controllers 8, 9 cannot detect the insertion of the key 1 into the key cylinder 31. Instead, since a predetermined voltage (5 V) is always applied to the main relay controller 15, the main relay controller 15 can detect the insertion of the key 1 into the key cylinder 31.

Therefore, the anti-theft controller 8 and the engine controller 9 need not be set to the sleep mode after the key insertion switch 2 is closed and the above-described conditions 1) through 3) are met. Thus, each CPU of the anti-theft controller 8 and the engine controller 9 does not need to have hardware to implement-the sleep mode, and thus, their constructions can be made simple.

Also, in the present embodiment, if the engine 20 is not started when the key 1 is inserted into the key cylinder 31 and if this state remains unchanged for one minute, signals 23, 24 become low. Further, during this time, since step 235 makes the signal 25 high and the reset terminal R of the flip flop 15b is set, the output of the output terminal Q of the flip flop 15b becomes low. As a result, the input (signal 26) of the base of the first transistor 11 becomes high and the contact point 21b opens. Thus, the power supply to the anti-theft controller 8, the engine controller 9, the EEPROM 10 and the transceiver 16 is stopped.

Thus, in the first case which is the present invention, by opening the contact point 21b after one minute elapses after the key 1 is inserted into the key cylinder 31, compared with a second case in which the contact point 21b remains closed after one minute elapses, the following effects are obtained.

In the second case, when the key insertion switch 2 is closed for some reason, the output signal 26 is always at the low level and the contact point 21b remains closed. That is, the power supply to the anti-theft controller 8 and the engine controller 9 is continued.

When the legal driver inserts the key 1 into the key cylinder 31, step 130 in FIG. 4 determines a match and the anti-theft determination flag in the region 10a of the EEPROM 10 is reset. This condition of the anti-theft determination flag is maintained.

Thereafter, even though the legal driver stops the engine 20 and leaves the vehicle after pulling out the key 1, the content of anti-theft determination flag remains reset, and therefore, when another driver tries to forcibly actuate the injector 20a and the igniter 20b, for example, the start of the engine 20 will be allowed. That is, the vehicle can be stolen.

Therefore, in the first case which is that of the present invention, when one minute elapses after the key 1 is inserted into the key cylinder 31 and the engine 20 has not been started, the contact point 21b is opened. That is, power supply to the anti-theft controller 8, the engine controller 9, the EEPROM 10 and the transceiver 16 is stopped.

Thus, even though another driver tries to forcibly supply power to the anti-theft controller 8, step 130 gives a negative output and the anti-theft determination flag is set so that the starting of the engine 20 is prohibited. That is, theft of the vehicle can be prevented.

In the present embodiment, when step 225 gives a negative output, the anti-theft determination flag in the region 10a of the EEPROM 10 is set and so, the following effects are obtained.

That is, when the contact point 21b remains closed for some reason, power is always supplied to the anti-theft controller 8. Therefore, when the legal driver inserts the key 1 into the key cylinder 31, the anti-theft determination flag is reset. The reset anti-theft determination flag is stored in the region 10a of the EEPROM 10.

Even though the legal driver stops the engine 20, pulls out the key 1 and leaves the vehicle, since the stored content of the anti-theft determination flag remains at 0. Therefore, when another driver other than the legal driver tries to forcibly actuate the injector 20a and the igniter 20b, the start of the engine 20 is allowed. That is, the vehicle can be stolen.

According to the present embodiment, when the legal driver stops the engine 20, step 230 sets the anti-theft determination flag. Even if the injector 20a and the igniter 20b are actuated, since the anti-theft determination flag is set, the start of the engine 20 is prohibited. That is, the theft of the vehicle can be prevented.

Also, in the present embodiment, when the ignition switch 3 is switched from the closed state to the open state, the training value of the engine 20 is stored in the region 10b of the EEPROM 10. A process of step 425 is not carried out until this storage process is completed. That is, since the high level signal is generated from the CPU main relay control port 90a, the contact point 21b remains closed and power supply to the engine controller 9 is continued. Therefore, the storage of the training value can be reliably performed.

Since the region 10a for storing the anti-theft determination flag and the region 10b for storing the training value are provided in the EEPROM 10, the number of parts and the cost of the anti-theft device can be reduced, compared to the case in which the region 10a is provided in the anti-theft controller 8 and the region 10b is provided in the engine controller 9.

Since the EEPROM 10 is connected to the engine controller 9 which can handle a large volume of communication and communication between the EEPROM 10 and the anti-theft controller 8 is carried out by DMA, communication efficiency improves compared to the case in which there is no DMA.

Figure 9:
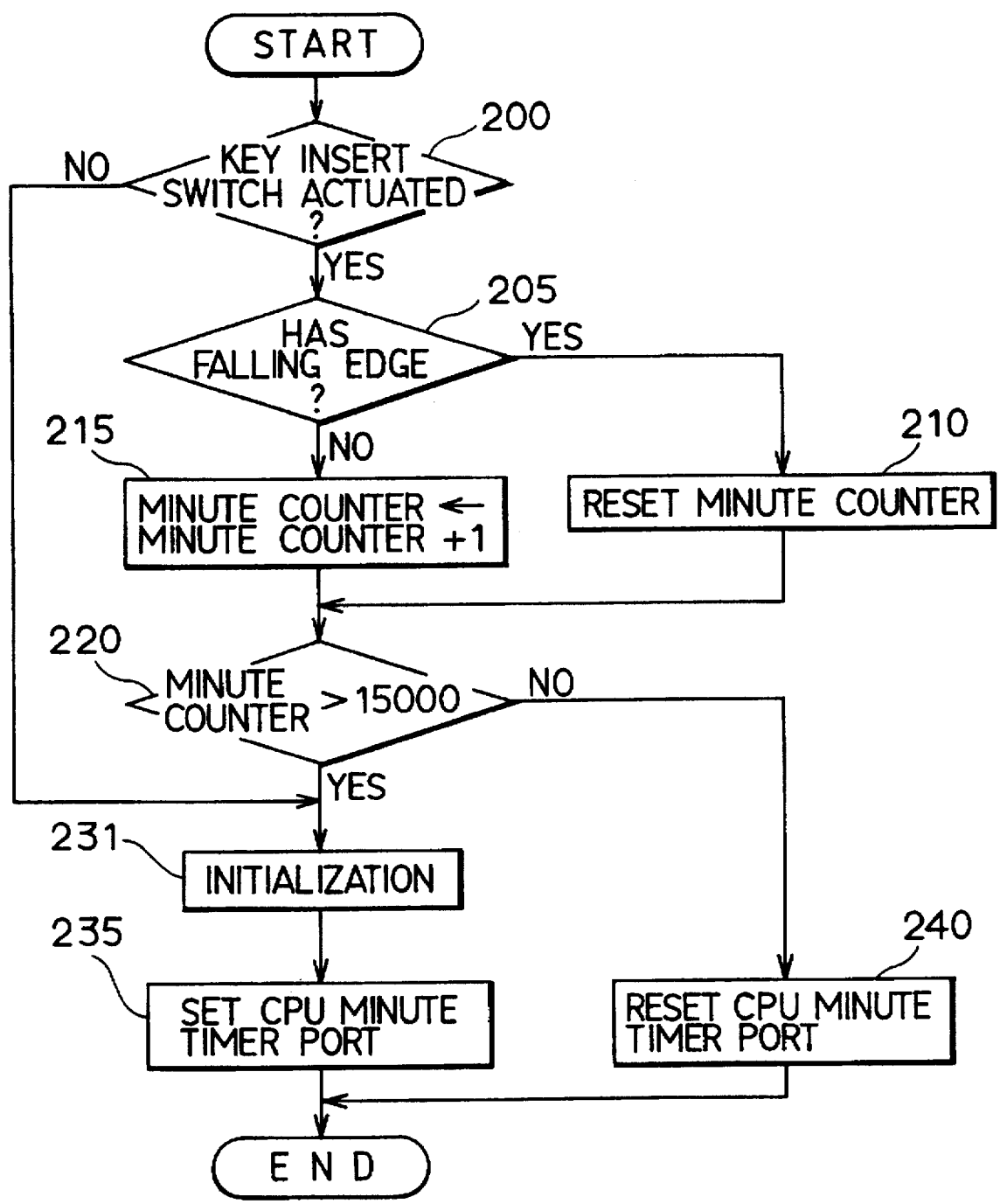
FIG. 9 is a flowchart illustrating an interrupt routine of the anti-theft controller according to another embodiment of the present invention.

In the above-described embodiment, for the routine of FIG. 5 which is executed by the anti-theft controller 8, when step 220 gives a positive output, step 225 determines if the ignition switch 3 is actuated or not and if step 225 gives a negative output, control goes to step 230. As shown in FIG. 9, in another embodiment of the present invention, when step 220 gives a positive output, step 231 may execute the routine shown in FIG. 4.

In this case, when step 220 gives a positive output, the secret identification code of the key 1 and the secret identification code in the region 10c of the EEPROM 10 are again compared. Therefore, even though another driver tries to forcibly actuate the injector 20a and the igniter 20b, since the driver does not have the right key 1, the anti-theft determination flag is set and the start of the engine 20 is prohibited. That is, the theft of the vehicle is prevented.

Although the present invention has been fully described in connection with preferred embodiments thereof with reference to the accompanying drawings, it is to be noted that various changes and modifications will become apparent to those skilled in the art.

For example, contact points 21b may be provided on a first power line connecting the battery 5 and the anti-theft controller 8 and on a second power line, which branches from the first power line, connected to the engine controller 9. Each contact point 21b may be opened/closed by driving them together.

Although the detection of the actuation of the key insertion switch 2 is performed before the secret identification code of the key 1 is verified, other operations may be performed before verifying the secret identification code of the key 1. Such operations may use a seat switch which detects if a passenger is seated or not, a door switch which detects the opening of the door, a seat belt switch for detecting the fastening of a seat belt, devices which detect door lock signals from units that unlock doors using radio waves, infrared waves and the like.

In the above-described embodiment, although the main relay controller 15 is implemented as hardware, software may also be used to realize the functions of the main relay controller 15. In place of the key 1, a card in which the secret identification code is stored may also be used.

Although the anti-theft controller 8 is used in the vehicle having the engine 20, the anti-theft controller 8 can be used in a vehicle such as an electric vehicle which has no engine. In this case, the motor in claim 1 may be replaced with an electric motor.

Although the secret identification code verification unit in the present embodiment is used in a vehicle, the secret identification code verification unit may be used, for example, for boats. That is, the secret identification code verification unit may be applied for any moving body which moves when its motor is driven.

Such changes and modifications are to be understood as being within the scope of the present invention as defined by the appended claims.

What is claimed is:

1. An anti-theft device for verifying a first secret identification code transmitted by a start command device with reference to a second secret identification code of a moving body driven by a motor, said anti-theft device comprising:
   start command detection means for detecting a start condition indicative of start of a transmission operation of said start command device;
   a main relay unit for receiving power from an external power source;
   a receiver for receiving said first secret identification code from said start command device when said start command detection means detects said start condition;
   a secret identification code verification unit which is connected to said external power source, said secret identification code verification unit being for receiving said first secret identification code from said receiver and for generating a verification signal after comparing said first secret identification code and said second secret identification code, said secret identification code verification unit being actuated after receiving power from said external power source when said start command detection means detects said start condition; and
   a motor controller which is connected to said external power source, said motor controller being for receiving said verification signal from said secret identification code verification unit and for controlling said motor based on said verification signal after receiving power from said external power source when said start command detection means detects said start condition.

2. An anti-theft device according to claim 1, wherein said start command device is an ignition key which is inserted into a key cylinder of said moving body.

3. An anti-theft device according to claim 2, wherein:
   said start condition is indicative of insertion of said ignition key into said key cylinder of said moving body; and
   said start command detection means is a switch which actuates when said ignition key is inserted into said key cylinder of said moving body.

4. An anti-theft device according to claim 3, wherein said main relay unit is for always receiving power from said external power source and for allowing said reception of power by said secret identification code verification unit from said external power source when said start command detection means detects said start condition.

5. An anti-theft device according to claim 4, wherein said main relay unit is for allowing said reception of power by said motor controller from said external power source when said start command detection means detects said start condition.

6. An anti-theft device according to claim 3, wherein said main relay unit is for always receiving power from said external power source and for allowing reception of power by said motor controller from said external power source when said start command detection means detects said start condition.

7. An anti-theft controller according to claim 1, wherein:
   said motor controller is for allowing starting of said motor when said verification signal from said secret identification code verification unit indicates a match of said first secret identification code with said second secret identification code; and
   said motor controller is for prohibiting starting of said motor when said verification signal from said secret identification code verification unit indicates a mismatch of said first secret identification code with said second secret identification code.

8. An anti-theft device according to claim 1, wherein said main relay unit includes an R-S flip-flop.

9. An anti-theft device according to claim 1, said anti-theft device further comprising:
   an ignition switch which actuates when a key is rotated to an ignition position of a key cylinder;
   wherein said main relay unit is for always receiving power from said external power source and for allowing reception of power by said secret identification code verification unit from said external power source even if said ignition switch is deactuated.

10. An anti-theft device according to claim 9, wherein said motor controller is for prohibiting starting of said motor unless said ignition switch is actuated before a predetermined time lapses since said start command detection means detects said start condition.

11. An anti-theft device for verifying a first secret identification code transmitted by a start command device with reference to a second secret identification code of a moving body driven by a motor, said anti-theft device comprising:
   start command detection means for detecting a start condition indicative of start of a transmission operation of said start command device;
   a receiver for receiving said first secret identification code from said start command device when said start command detection means detects said start condition;
   a secret identification code verification unit which is connected to an external power source, said secret identification verification unit being for receiving said first secret identification code from said receiver and for generating a verification signal after comparing said first secret identification code and said second secret identification code, said secret identification code verification unit being actuated after receiving power from said external power source when said start command detection means detects said start condition;

first switching means for connecting and disconnecting said secret identification code verification unit from said external power source;

a motor controller which is connected to said external power source, said motor controller being for receiving said verification signal from said secret identification code verification unit and for controlling said motor based on said verification signal after receiving power from said external power source when said start command detection means detects said start condition;

second switching means for connecting and disconnecting said motor controller from said external power source; and a main relay unit which is connected to said external power source to always receive power from said external power source, said main relay unit being for controlling said first switching means to connect said secret identification code verification unit with said external power source when said start command detection means detects said start condition and for controlling said second switching means to connect said motor controller with said external power source when said start command detection means detects said start condition.

12. An anti-theft device according to claim 11, wherein:

said motor controller is for allowing starting of said motor when said verification signal from said secret identification code verification unit indicates a match of said first secret identification code with said second secret identification code; and said motor controller is for prohibiting starting of said motor when said verification signal from said secret identification code verification unit indicates a mismatch of said first secret identification code with said second secret identification code.

13. An anti-theft device according to claim 12, said anti-theft device further comprising:

a first memory;

verification result storage means for storing verification information indicative of said verification signal in said first memory;

time measurement means for measuring elapsed time since said start command detection means detected said start condition; and measurement time determination means for determining if said elapsed time is no less than a predetermined amount of time, wherein said main relay unit is for controlling said first and said second switching means to disconnect said secret identification code verification unit and said motor controller from said external power source when said measurement time determination means determines that said elapsed time is no less than said predetermined amount of time.

14. An anti-theft device according to claim 13, said anti-theft device further comprising verification result revision means for setting said verification information stored in said first memory to indicate a mismatch when said measurement time determination means determines that said elapsed time is no less than said predetermined amount of time.

15. An anti-theft device according to claim 13, said anti-theft device further comprising additional verification means for driving said secret identification code verification unit to recompare said first and said second secret identification codes when said measurement time determination means determines that said elapsed time is no less than said predetermined amount of time.

16. An anti-theft device according to claim 13, said anti-theft device further comprising further comprising:

termination signal generation means for generating a termination signal for terminating said motor;

motor termination determination means for determining whether said termination signal generation means generated said termination signal;

a second memory;

training value storage means for storing a training value of said motor in said second memory when said motor termination determination means determines said termination signal has been generated by said termination signal generation means; and training value storage completion determination means for determining whether said training value storage means has completed storage of said training value in said second memory;

wherein said main relay unit is for controlling said first and said second switching means to disconnect said secret identification code verification unit and said motor controller from said external power source after said training value storage completion determination means determines completion of said storage of said training value.

17. An anti-theft device according to claim 16, wherein:

said first memory is connected to said secret identification code verification unit; and said second memory is connected to said motor controller.

18. An anti-theft device according to claim 17, wherein said first memory is connected to said motor controller.

19. An anti-theft device according to claim 18, wherein both said first memory and said second memory retain their stored contents even if said first memory and said second memory are deactuated.

20. An anti-theft device-according to claim 11, wherein:

said moving body includes an insertion member into which said start command device is inserted; and said start command detection means is an insertion detection switch for detecting insertion of said start command device into said insertion member.

* * * * *